Patented Nov. 21, 1933

1,936,553

UNITED STATES PATENT OFFICE 1,936,553

PREPARATION OF PURE IODINE

Coulter W. Jones, Shreveport, La., assignor to Jones Chemical Company, Inc., McDade, La., a corporation of Louisiana No Drawing. Application January 18, 1932.
Serial No. 587,446

13 Claims. (Cl. 23—216)

In the commercial processes for extracting iodine from natural iodiferous brines, the brine, which in all cases so far known contains at most an extremely small percentage of iodine, is treated with a suitable oxidizing agent, e. g. chlorine, to liberate the iodine in the elemental state. A direct separation from the aqueous medium of the minute amounts of free iodine present by the usual method of settling and filtration is not possible, owing to the fact that such amounts of iodine are considerably below the limit of solubility thereof in the aqueous medium. It is necessary, therefore, to vaporize the iodine by steaming or blowing out with air, and to recover the vapors by absorption in a suitable liquid medium, usually in an aqueous alkali, or by adsorption upon a suitable solid medium such as active carbon or charcoal. In the case of absorption of iodine in an aqueous alkali, the iodine is obtained in chemically combined form as a mixture of alkali metal iodide and iodate, while in the last-mentioned case the iodine may be recovered from the charcoal by leaching with a hot aqueous alkali, whereby owing to the reducing action of the charcoal a solution of iodide may be obtained which is substantially free from iodate. The iodine is recovered in any case, therefore, not as the pure element, but in chemically combined form as the alkali metal iodide or a mixture of the iodide and iodate.

In order to prepare pure iodine in marketable form the aforesaid iodine compounds must then be subjected to further chemical treatment. According to the method heretofore employed, the iodine is precipitated in the elemental state from a suitably concentrated solution of the compound, the precipitate is separated from the solution by filtration and the wet crystals so obtained are purified by sublimation. This method is open to objection, in that the removal of water from the moist crystals is attended with an appreciable loss of iodine as vapor accompanying the water vapor, the recovery of which is difficult and imposes an added cost on the process. The sublimation of iodine is also a time-consuming operation which is wasteful of heat and not well adapted to large scale manufacture.

I have now found that iodine of highest purity may be prepared directly from an iodide, or mixture of the same with an iodate, without necessity for separating the precipitated iodine from the aqueous medium by filtering and washing, transferring to a separate apparatus and finally subliming to complete the purification. The improved method constituting my invention consists in the steps hereinafter fully described and particularly pointed out in the claims.

In carrying out my improved method, an aqueous solution of a soluble iodide, or of an iodide and iodate together, is first subjected to appropriate chemical treatment to liberate iodine in the elemental state, as in the known methods. In case an iodide is used, treatment with an oxidizing agent, e. g. chlorine or nitrous acid, will cause the separation of free iodine. On the other hand, if an iodate is present, treatment with a suitable reducing agent, such as formaldehyde, formic acid, or the equivalent may be resorted to for converting the iodate to iodide, which may then be further treated as just described. With a mixture of iodide and iodate simple acidification with a mineral acid, however, will result in precipitating iodine, and if the molecular proportion is in the ratio of 5 iodide to 1 iodate, such precipitation by acidification will be quantitative, in accordance with the typical equation;

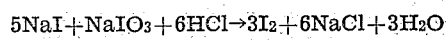

$$5NaI + NaIO_3 + 6HCl \rightarrow 3I_2 + 6NaCl + 3H_2O$$

If there is a deficiency either of iodate or of iodide as required by the equation, this may be made up by suitable addition to the solution prior to acidification.

Following precipitation of the iodine the aqueous mixture or suspension, instead of being filtered to separate the iodine, is to be heated to a temperature sufficient to melt the iodine, i. e. above 114° C., whereby the molten iodine settles out as a separate layer beneath the supernatant aqueous solution. If the precipitation of iodine takes place in a relatively concentrated aqueous iodide solution, the heat of reaction developed may supply all, or at least a material part of, the heat required for melting the iodine. The molten iodine may then be drawn off into molds to solidify and is obtained thereby directly in a form substantially free from moisture and all impurities.

If the aqueous solution in which the iodine is suspended has an atmospheric boiling point below 114° C. the heating naturally is to be conducted under pressure in order to maintain the solution in liquid phase at a temperature sufficient to melt the iodine. It is most advantageous, however, to select suitable salts of iodine and reagents for the chemical treatment thereof to produce a suspension of iodine in an aqueous solution of a compound which has, or is capable of being concentrated to, an atmospheric boiling point materially above 114° C. without having reached saturation with respect to a crystallizable solid phase. Examples of such solutes are calcium chloride, magnesium chloride, sulphuric acid and phosphoric acid, or mixtures of such acids with the corresponding acid salts. A preferred procedure, accordingly, is to produce a suspension of precipitated iodine in an aqueous solution of, for example, calcium chloride or magnesium chloride of such concentration that it may be heated under atmospheric pressure to a temperature sufficient to melt the iodine and permit separation thereof from the aqueous solution by stratification. A suitable concentration for the purpose is provided by a calcium chloride solution containing from about 35 to 65 per cent $CaCl_2$ and having a boiling point range of from 115° to 150° C., or by a magnesium chloride solution containing from about 30 to 45 per cent $MgCl_2$ and having a boiling point range of from 115° C. to about 145° C.

The simplest procedure for applying the invention employs an aqueous iodide solution, e. g. a solution of NaI, KI, $CaI_2$ or $MgI_2$. The solution, which should be neutral or slightly acid, is treated with a suitable oxidizing agent, such as chlorine, bromine, nitrous acid, a chlorate, etc., to liberate iodine in the elemental state, preferably adding only sufficient oxidizing agent for quantitative liberation of iodine without leaving any material excess of the agent. In general, chlorine is the most convenient, as well as the cheapest, oxidizer for the purpose. The suspension of iodine thereby obtained is heated, under pressure if necessary, to a temperature above 114° C. to melt the iodine, which then separates as a lower liquid layer beneath the supernatant aqueous layer, and may be drawn off in any suitable way, such as by siphoning, into a suitable mold and allowed to solidify.

By chlorinating a calcium iodide solution or a magnesium iodide solution of suitable strength, a suspension of iodine in a chloride solution may be obtained directly having a boiling point above 114° C.; or, if necessary, more chloride may be added to bring up the concentration, and hence the boiling point, sufficiently so that the melting operation may be conducted at atmospheric pressure, the aqueous solution forming a protective layer to prevent any material loss of iodine by vaporization. For example, an approximately 65 per cent $CaI_2$ solution may be chlorinated just sufficiently to precipitate all of the iodine in the elemental state, whereby is obtained a suspension of iodine in an approximately 40 per cent $CaCl_2$ solution having a boiling point of about 120° C. By working in such concentration sufficient heat of reaction is evolved to heat the mixture above the melting point of iodine. Using proper precautions to conserve heat during the chlorination, therefore, molten iodine will settle out as a liquid layer from the reaction mixture without the application of external heat and may be drawn off into molds to solidify.

When starting with an alkali metal iodide solution, the same may be first converted to a calcium or magnesium iodide solution by adding an equivalent amount of calcium or magnesium chloride and evaporating to crystallize out alkali metal chloride, which is separated by filtration or other suitable means. The resulting mother liquor consists of a solution of calcium or magnesium iodide which may then be chlorinated to liberate the iodine, and further processed as already described. For example, 100 parts by weight of a 60 per cent NaI solution is treated with 110 parts of a 50 per cent $CaCl_2$ solution. The mixed solution is evaporated to crystallize out NaCl, leaving a mother liquor consisting of an approximately 60 to 65 per cent $CaI_2$ solution. The latter solution is then chlorinated to liberate the iodine and form a $CaCl_2$ solution of such strength that it may be heated directly at atmospheric pressure by the reaction heat or otherwise to a temperature sufficient to melt the iodine and form a liquid layer thereof which may be drawn off from the aqueous solution.

When iodine vapors are absorbed directly in an aqueous alkali in the primary extraction process, a solution of the corresponding alkali metal iodide and iodate is formed containing the same in proportions approaching the theoretical molecular ratio of 5 to 1. Upon acidification of such solution, iodine will be precipitated. For such acidification a mineral acid may be employed, such as sulphuric acid or hydrochloric acid. If, as is usually the case, there should be an excess over the theoretical proportion of iodide, the solution after acidification may be oxidized, e. g. by chlorinating, sufficiently to precipitate the iodine corresponding to such excess of iodide, in order to effect a quantitative separation of iodine, or sufficient iodate may be added from another source to make up the deficiency thereof prior to acidification. Following precipitation of the iodine, the suspension is to be heated under pressure to a temperature sufficient to melt the iodine and the latter drawn off as a liquid layer, as previously described. A modified procedure, which avoids the necessity of heating under pressure, consists in acidifying the solution of alkali metal iodide and iodate in proper proportions with a sufficient excess of sulphuric acid or phosphoric acid so that the resulting solution, in which the precipitated iodine is suspended, has a concentration such that the boiling point thereof is above 114° C., thereby enabling the iodine to be melted by heating the suspension under atmospheric pressure.

In case it is desired to convert the solution of alkali metal iodide and iodate to the corresponding calcium compounds prior to precipitating iodine therefrom, such solution may be treated with calcium chloride in amount equivalent to the iodine compounds. Thereby is produced a solution of iodide and chloride and a precipitate of the relatively insoluble calcium iodate. The calcium iodate may be filtered off and worked up separately. The filtrate is concentrated to crystallize out alkali metal chloride, leaving a mother liquor containing calcium iodide which may then be chlorinated and further processed as already described to separate liquid iodine therefrom.

The herein described procedure for the direct production of liquid iodine yields a product directly which is substantially anhydrous and free from mineral impurities, while avoiding the step of purification by sublimation which has characterized all processes for preparing pure iodine hitherto described and used. Iodine has been prepared by my improved procedure having a purity of 99.9 per cent or better, with a non-volatile residue as low as 0.005–0.02 per cent, thereby exceeding the requirements of the U. S. Pharmacopeia.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of preparing pure iodine, wherein such iodine is precipitated from a solution of a compound thereof to form an aqueous suspension of the iodine, the step which consists in heating such suspension to a temperature sufficient to melt the iodine, while maintaining the mixture substantially in liquid phase.

2. The method of preparing pure iodine which comprises liberating iodine in an aqueous solution of a compound thereof, heating the resulting suspension to a temperature above the melting point of iodine, while maintaining the same substantially in liquid phase, and separating the iodine layer thereby formed from the aqueous solution.

3. The method of preparing pure iodine which comprises oxidizing a solution of an iodide to precipitate iodine therefrom, heating the resulting suspension to a temperature above the melting point of iodine while maintaining the same substantially in liquid phase and separating liquid iodine from the aqueous solution.

4. The method of preparing pure iodine which comprises acidifying a solution of an iodide and an iodate containing the same in a molecular ratio of approximately 5 to 1 to precipitate iodine therein, heating the resulting suspension to a temperature above the melting point of iodine while maintaining the same substantially in liquid phase and separating liquid iodine from the aqueous solution.

5. The method of preparing pure iodine which comprises acidifying a solution of an iodide and iodate containing the same in a molecular ratio of approximately 5 to 1 by adding an acid of the group consisting of sulphuric acid and phosphoric acid, whereby to precipitate iodine in the aqueous medium, adding an excess of the acid sufficient to produce a solution having a boiling point above 114° C., heating the suspension of iodine in the solution to melt the iodine, and separating liquid iodine from the aqueous solution.

6. The method of preparing pure iodine which comprises chlorinating a solution of an iodide of a metal selected from the group consisting of the alkali and alkaline earth metals and magnesium, heating the resulting suspension to a temperature above the melting point of iodine while maintaining the same substantially in liquid phase and separating liquid iodine from the aqueous solution.

7. The method of preparing pure iodine which comprises chlorinating a calcium iodide solution to precipitate iodine therefrom, heating the resulting suspension to a temperature above the melting point of iodine while maintaining the same substantially in liquid phase and separating liquid iodine from the aqueous solution.

8. The method of preparing pure iodine which comprises chlorinating an approximately 60 to 65 per cent calcium iodide solution, maintaining the resulting suspension of iodine in a calcium chloride solution at a temperature above 114° C. and separating liquid iodine from such aqueous solution.

9. The method of preparing pure iodine which comprises intermixing an alkali metal iodide solution with a solution of a chloride of a metal selected from the group consisting of calcium and magnesium, such iodide and chloride being in substantially chemically equivalent proportion to each other, evaporating the mixed solution to crystallize out alkali metal chloride and leave a solution of calcium or magnesium iodide, chlorinating such iodide solution to precipitate iodine therefrom, heating the resulting suspension to a temperature above the melting point of iodine while maintaining the same substantially in liquid phase and separating molten iodine from the aqueous solution.

10. The method of preparing pure iodine which comprises intermixing a sodium iodide solution and a calcium chloride solution in substantially chemically equivalent proportions, evaporating to crystallize out sodium chloride and leave an approximately 60 to 65 per cent calcium iodide solution, chlorinating said iodide solution to liberate iodine therefrom, while raising the temperature of the reaction mixture above 114° C., and separating liquid iodine from the calcium chloride solution.

11. The method of preparing pure iodine which comprises intermixing an alkali metal iodide solution containing some iodate with a calcium chloride solution in substantially chemically equivalent amount to such iodide and iodate, filtering off calcium iodate, evaporating the filtrate to crystallize out alkali metal chloride and leave a solution of calcium iodide, chlorinating the latter to liberate iodine therefrom, heating the resulting suspension of iodine to a temperature above 114° C. while maintaining the same substantially in liquid phase and separating liquid iodine from the aqueous calcium chloride solution.

12. The method of preparing pure iodine which comprises intermixing a sodium iodide solution containing some iodate with a calcium chloride solution in substantially chemically equivalent amount to said iodide and iodate, filtering off calcium iodate, evaporating the filtrate to crystallize out sodium chloride and leave an approximately 60 to 65 per cent calcium iodide solution, chlorinating the latter to liberate iodine therefrom while raising the temperature of the reaction mixture above 114° C., and separating liquid iodine from the aqueous solution of calcium chloride.

13. The method of preparing purified iodine directly which comprises liberating iodine in a concentrated aqueous solution of a compound thereof to produce a suspension of iodine in the aqueous medium, heating such suspension to a temperature above the melting point of iodine, while maintaining the same substantially in liquid phase, permitting the molten iodine to settle as a separate layer beneath the supernatant aqueous solution layer and separating the two layers from each other.

COULTER W. JONES.